United States Patent
McCoy

(10) Patent No.: US 9,279,226 B1
(45) Date of Patent: Mar. 8, 2016

(54) METHOD OF REMOVING POLLUTANTS FROM A BODY OF WATER USING CONTAINERS FILLED WITH MILKWEED FLOSS

(71) Applicant: Debra K. McCoy, Bridgewater, SD (US)

(72) Inventor: Debra K. McCoy, Bridgewater, SD (US)

( * ) Notice: Subject to any disclaimer, the term of this patent is extended or adjusted under 35 U.S.C. 154(b) by 203 days.

(21) Appl. No.: 13/858,961

(22) Filed: Apr. 9, 2013

Related U.S. Application Data

(60) Provisional application No. 61/686,738, filed on Apr. 10, 2012.

(51) Int. Cl.
*E02B 15/04* (2006.01)
*C02F 1/28* (2006.01)
*E02B 15/06* (2006.01)
*E02B 15/10* (2006.01)

(52) U.S. Cl.
CPC .......... *E02B 15/04* (2013.01); *C02F 1/286* (2013.01); *E02B 15/06* (2013.01); *E02B 15/101* (2013.01)

(58) Field of Classification Search
CPC ....... E02B 15/06; E02B 15/101; E02B 15/04; C02F 1/286; C02F 2101/32; A01G 13/0281

USPC ........ 210/242.1, 242.4, 282, 484, 502.1, 924, 210/747.6
See application file for complete search history.

(56) References Cited

U.S. PATENT DOCUMENTS

| | | | |
|---|---|---|---|
| 5,348,661 A * | 9/1994 | Hill | 210/680 |
| 5,595,652 A * | 1/1997 | Rainer | 210/282 |
| 6,195,935 B1 * | 3/2001 | Bellucci et al. | 47/9 |
| 2013/0240454 A1 * | 9/2013 | Youngs et al. | 210/691 |

FOREIGN PATENT DOCUMENTS

GB 2413335 A * 10/2005 ............. C11D 17/04

* cited by examiner

*Primary Examiner* — Matthew O Savage
(74) *Attorney, Agent, or Firm* — Jeffrey A. Proehl; Woods, Fuller, Shultz & Smith, P.C.

(57) ABSTRACT

An apparatus for the collection of pollutants may comprise at least one porous container including an outer boundary material defining an inner space of the container, and a volume of collection material formed from the floss of certain plants, with the collection material being buoyant. A method of collecting pollutants from a body of water may comprise providing a plurality of porous containers with inner spaces, positioning milkweed floss in the inner spaces of the containers, and placing the floss-filled containers in the body of water adjacent to a pollutant.

3 Claims, 2 Drawing Sheets

US 9,279,226 B1

METHOD OF REMOVING POLLUTANTS FROM A BODY OF WATER USING CONTAINERS FILLED WITH MILKWEED FLOSS

REFERENCE TO RELATED APPLICATION

This application claims priority to U.S. Provisional Patent Application No. 61/686,738, filed Apr. 10, 2012, the entirety of which is hereby incorporated by reference.

BACKGROUND

Field

The present disclosure relates to floss and more particularly pertains to new filtration and collection devices using plant floss.

SUMMARY

In one aspect, the present disclosure relates to an apparatus for the collection of pollutants that may comprise at least one porous container including an outer boundary material defining an inner space of the container, and a volume of collection material formed from the floss of certain plants, with the collection material being buoyant.

In another aspect, the present disclosure relates to a system for the collection of pollutants from a body of water. The system may comprise a containment boom comprising a plurality of pollution collection apparatus, and a connection member including an outer liquid-permeable assembly receiving the plurality of pollution collection apparatus. The connection member may define an interior in which the pollution collection apparatus are positioned. Each of the pollution collection apparatus may comprise at least one porous container including an outer boundary material defining an inner space of the container, and a volume of collection material formed from the floss of certain plants, the collection material being buoyant.

In another aspect, the present disclosure relates to a method of collecting pollutants from a body of water. The method may comprise providing a plurality of porous containers with inner spaces, positioning milkweed floss in the inner spaces of the containers, and placing the floss-filled containers in the body of water adjacent to a pollutant. In some implementations, the method may additionally comprise positioning the plurality of containers into an interior of an elongated connection member to form a containment boom, and placing the containment boom in the body of water about an area of pollution. In some implementations, the method may additionally comprise removing the containers from the body of water, replacing pollutant-absorbed floss in the containers with clean floss, and re-placing the containers in the body of water. In some implementations, the method may additionally comprise removing the containers from the body of water, and positioning the containers on the ground about a plant growing in the ground so that algae absorbed in the floss may be exposed to the plant.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
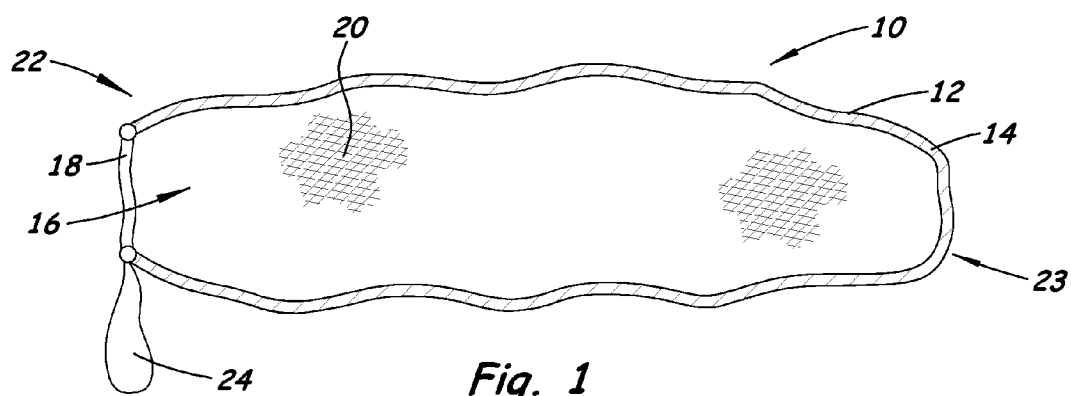
FIG. 1 is a side sectional view of a container containing floss.

With reference now to the drawings, and in particular to FIGS. 1 through 5 thereof, a new filtration and collection devices using floss embodying the principles and concepts of the disclosed subject matter will be described.

Equipment such as that shown in U.S. Pat. No. 4,959,038 (hereby incorporated by reference in its entirety) demonstrate that efficient processing of the plant known as milkweed is available. This technology enables complete separation of the floss of these plants from the pod hulls and seeds.

Applicant has recognized that the processing of a strategic reserve of milkweed pods in the event of certain emergencies, such as those involving chemical spills, represents an efficient and excellent use of this otherwise underutilized nuisance plant. Of particular interest is the use of varieties of milkweed that provide relatively high yields of milkweed, such as that grown in the South Dakota and adjacent areas, that exhibit relatively higher weights of floss per pod.

In general, the applicant has recognized that the floss may be blow-processed into resilient liquid permeable tubes, sacks or bags and positioned in a body of water proximate to a naturally- or non-naturally-occurring pollutant, particularly those pollutants that tends to float at the surface of the water, as the milkweed floss tends to demonstrate a high degree of buoyancy.

In one aspect, the disclosure relates an apparatus for collection pollutants, such as pollutants in a liquid or substantially flowable form, from a body of water or other fluid. The pollutants may include hydrocarbon substances, such as substances of the petrochemical type, although other substances may be collected by the apparatus.

In some embodiments, the apparatus 10 may comprise at least one porous container 12, and in many implementations a plurality of the porous containers 12 are employed in the apparatus. The container may include an outer boundary material 14 that defines an inner space 16 of the container. The outer boundary material may be substantially continuous about the inner space, but may include an openable section 18 or mouth for receiving collection material 20 into (and out of) the inner space. The porous container 12 may have an elongated shape with opposite ends 22, 23, although this shape is not critical to the operation of the apparatus, and shapes that lack an elongated character may be utilized. The outer boundary material may be porous in character to facilitate movement of fluid through the boundary material, such as from a location exterior to the container 12 to a location in the inner space 16 of the container. The outer boundary material 14 may comprise a liquid permeable latticework of material, or a mesh-like material. A closure device 24 may be configured to selectively close the mouth 18 of the porous container. Suitable closure devices may include, for example, clamping devices that pinch the mouth in the container closed, drawstring closures that constrict the mouth, and the like. In some embodiments, the porous container 12 may comprise a bag with an opening. The containers or bags may vary in length but, in one embodiment, may be approximately two feet in diameter and approximately four feet in length, with an average weight for that embodiment being in a range of approximately 6 pounds to approximately 9 pounds. In practice, one acre of preferred yield may produce about 2000 to 3000 pounds of processed milkweed floss.

A volume of collection material 20 may be positioned in the inner space 16 of the container. The collection material 20 may comprise the floss of plants, which is sometimes referred to as pappus or silk. In some of the most preferred implementations, the floss positioned in the container has been processed to remove the seeds and husks of the plant. The floss of the collection material may have different and varying densities, which may be selected for the type or volume of pollutants or aquatic matter to be collected by the apparatus. The collection material may be buoyant, which may produce a buoyancy in a container 12 filled with the collection material. Floss of the milkweed plant provides a desirable degree of buoyancy. The collection material may also provide a degree of reusability in that some or all of the pollutants removed from the body of water by the collection material may be removed from the material.

A plurality of the porous containers with the collection material may be connected together to form a containment boom 26 that may be placed on a body of water to surround a spill of a substance that floats on the water. The containment boom may be formed by connecting the ends of the containers together in a permanent or releasable manner.

The apparatus 10 may include a connection member 30 that is configured to hold a plurality of the porous containers together, and may facilitate the formation of a containment boom from the apparatus. The connection members may include an outer liquid-permeable structure 32 that defines an interior 34 configured to receive a plurality of the porous containers with the containment material. The outer liquid-permeable structure 32 may have an outer perimeter wall 36 with holes therein to permit movement of water and pollutants through the wall to reach the containers 12 and the collection material therein. The outer perimeter wall 36 may be relatively more rigid than the outer boundary material of the containers to hold a shape, although the wall may be flexible.

The system of the disclosure may also include a retrieval station or machine that is configured to retrieve the porous containers and remove pollutants from the collection material of the retrieved porous containers.

In one exemplarily implementation, a quantity of the floss of the collection material 20 as described herein was introduced into a jar of fresh water with motor oil added to the water to represent a body of water with a pollutant. The floss 20 absorbed oil and remained floating near the surface of water, even after multiple extended freeze and thaw cycles, thus demonstrating the excellent buoyancy of this absorbent material even after collection of a pollutant.

Figure 2:
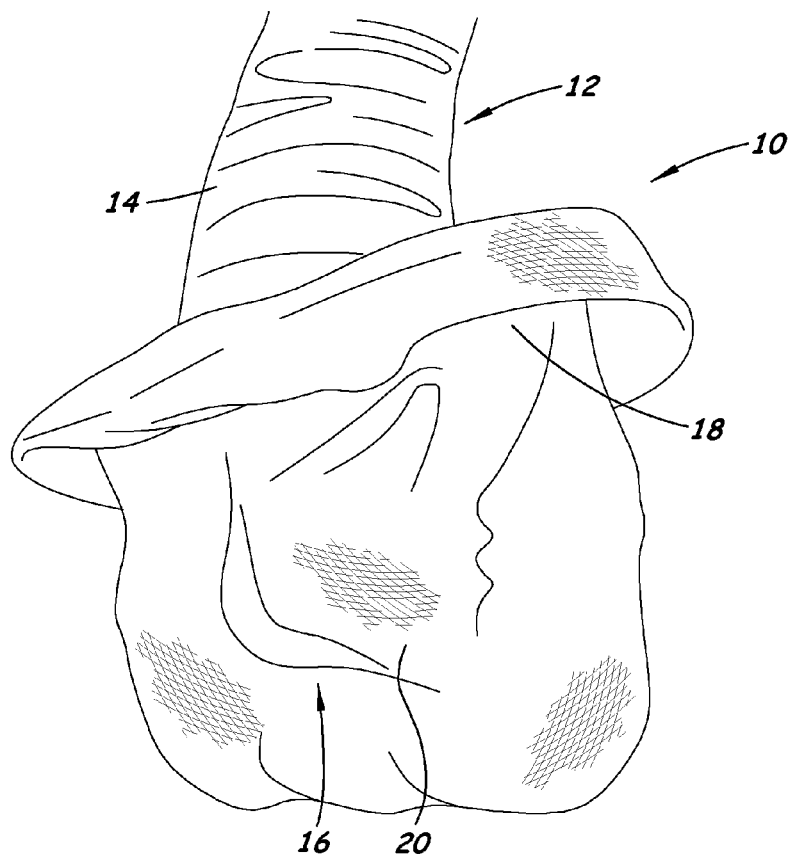
FIG. 2 is a front view of an openable section of a flexible tube-like structure having absorbent floss therein.

In an, shown in FIG. 2, the floss of the collection material 20 is shown positioned within the inner space of a porous container 12, which is illustratively shown in the form of a flexible tube-like structure with the openable section 18 opened and a portion of the outer boundary material 14 peeled back to reveal the inner space 16 and the material 20 therein. This configuration is suitable for connection to other similar containers in a connected boom-like assembly 26 suitable for use in containing water borne oil spills.

Figure 3:
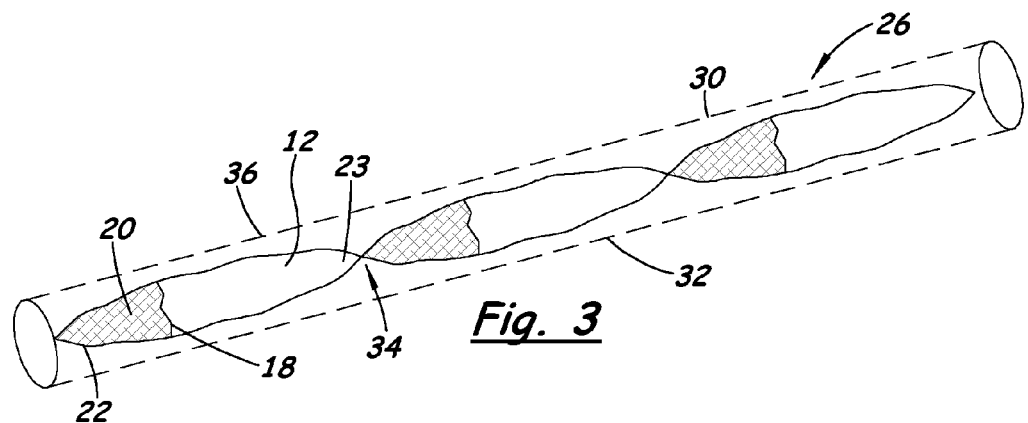
FIG. 3 is a perspective partial cutaway view of an assembly 48 shows a plurality of structures 36 having high-absorption processed floss therein.

In FIG. 3, a perspective partial cutaway view of an assembly of the porous containers 12 having high-absorption processed floss therein, ready for use on either land or water to contain a pollutant spill. What is also shown in this figure is the use of an optional outer structure 32 that is also liquid permeable. Outer structure 32 may be of various lengths so as to accommodate various quantities and varied lengths of containers 12 therein. In this regard, it is possible to form a boom 26 with a continuous or substantially continuous loop of absorbing containers 12 within the structure 32 that may be withdrawn from a body of water by a boat or land-based rig to remove the pollutant from the floss contained in the containers 12, optionally by blow drying the container 12 with the floss therein at a station on said rig. The containers 12 may be fed in a continuous manner into the volume formed by the outer perimeter wall 36 of the structure 32.

Figure 4:
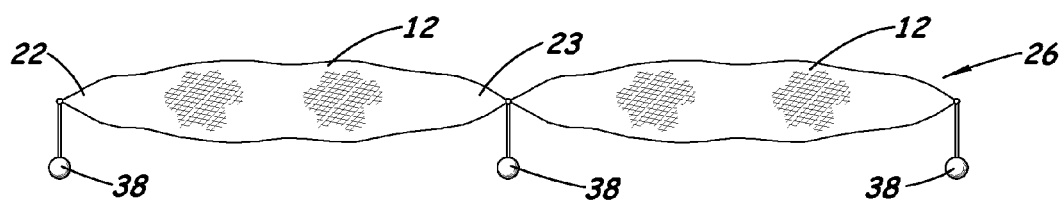
FIG. 4 is a further embodiment of a structure containing absorbent floss that is weighted by adjustable weights to ensure sub-surface travel through liquid.

In a further embodiment shown in FIG. 4, the porous container 12 with floss is weighted by weights 38 to ensure sub-surface travel through liquid. The sizing of the weighting may be adjustable, such as by adding or subtracting weights from the container or array of containers. In one example, that liquid may be a body of water having a chemical pollutant such as oil or gasoline, or it may have a natural pollutant such as algae or other aquatic growth. In either example, the pollutant tends to remain toward the surface of the water, and it is desirable to position the containers at the surface as well as small distance below the surface such that the pollutant may be bounded by the array of containers 12 held in a boom-like arrangement. The floss 20 provides an excellent absorbent media for removing such pollutants. Other substances such as cyanobacteria, sometimes referred to as "blue-green algae", may also be picked up by the floss.

Figure 5:
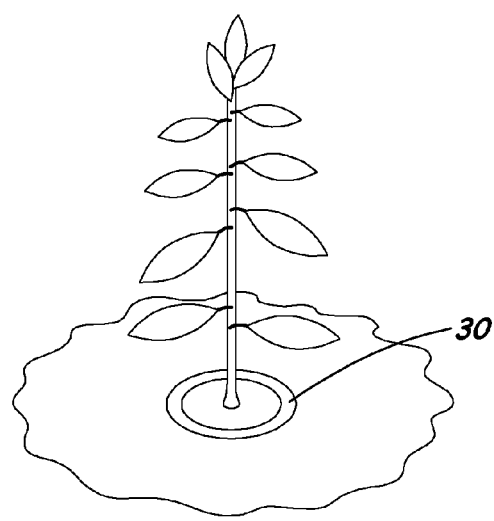
FIG. 5 is a side view of an embodiment of the invention used as an agricultural barrier for protecting and nurturing a tree or plant.

In a further embodiment, depicted in FIG. 5, the floss-containing containers 12 may be shaped or arrayed to capture or absorb algae from a body of freshwater and then be used as moisture- and nutrient-containing barriers for use around shrubs, trees or agricultural areas. This utilization is believed to provide excellent water retention and added nutrients for the adjacent flora. It is recognized that the structure of any container for holding floss may be of a stable and re-usable material, or it may be made of a degradable material, which may also include a nutrient suitable for assisting the growth of adjacent plantings.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A method of collecting pollutants from a body of water, the method comprising:
    providing a plurality of porous containers with inner spaces;
    positioning milkweed floss in the inner spaces of the containers;
    placing the floss-filled containers in the body of water adjacent to a pollutant; and
    removing the containers from the body of water, and positioning the containers on the ground about a plant growing in the ground so that algae absorbed in the floss may be exposed to the plant.

2. The method of claim 1 additionally comprising:
    positioning the plurality of containers into an interior of an elongated connection member to form a containment boom; and
    placing the containment boom in the body of water about an area of pollution.

3. The method of claim 1 additionally comprising removing the containers from the body of water, replacing pollutant-absorbed floss in the containers with clean floss, and replacing the containers in the body of water.

* * * * *